United States Patent
Abrego et al.

(10) Patent No.: US 6,850,886 B2
(45) Date of Patent: Feb. 1, 2005

(54) SYSTEM AND METHOD FOR SPEECH VERIFICATION USING AN EFFICIENT CONFIDENCE MEASURE

(75) Inventors: Gustavo Hernandez Abrego, Sunnyvale, CA (US); Xavier Menendez-Pidal, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 771 days.

(21) Appl. No.: 09/872,069

(22) Filed: May 31, 2001

(65) Prior Publication Data

US 2001/0049600 A1 Dec. 6, 2001

Related U.S. Application Data

(63) Continuation-in-part of application No. 09/553,985, filed on Apr. 20, 2000.
(60) Provisional application No. 60/160,859, filed on Oct. 21, 1999.

(51) Int. Cl.[7] .......................... G10L 15/00; G10L 15/14
(52) U.S. Cl. ....................... 704/240; 704/251
(58) Field of Search ................ 704/231, 236, 704/239, 240, 243, 246, 250, 251, 255, 270

(56) References Cited

U.S. PATENT DOCUMENTS

| | | | | |
|---|---|---|---|---|
| 5,710,864 A | * | 1/1998 | Juang et al. | 704/238 |
| 5,832,430 A | * | 11/1998 | Lleida et al. | 704/256 |
| 6,173,266 B1 | * | 1/2001 | Marx et al. | 704/270 |
| 6,182,037 B1 | * | 1/2001 | Maes | 704/247 |
| 6,226,612 B1 | * | 5/2001 | Srenger et al. | 704/256 |
| 6,473,735 B1 | * | 10/2002 | Wu et al. | 704/240 |
| 6,571,210 B2 | * | 5/2003 | Hon et al. | 704/251 |
| 6,735,562 B1 | * | 5/2004 | Zhang et al. | 704/240 |

* cited by examiner

*Primary Examiner*—Susan McFadden
(74) *Attorney, Agent, or Firm*—Gregory J. Koerner; Redwood Patent Law

(57) ABSTRACT

The present invention comprises a system and method for speech verification using an efficient confidence measure, and includes a speech verifier which compares a confidence measure for a recognized word to a predetermined threshold value in order to determine whether the recognized word is valid, where a recognized word corresponds to a word model that produces a highest recognition score. In accordance with the present invention, the foregoing confidence measure may be calculated using the recognition score for the recognized word and a pseudo filler score that may be based upon selected average recognition scores from an N-best list of recognition candidates.

43 Claims, 7 Drawing Sheets

SYSTEM AND METHOD FOR SPEECH VERIFICATION USING AN EFFICIENT CONFIDENCE MEASURE

CROSS-REFERENCE TO RELATED APPLICATIONS

This application is a Continuation-In-Part of, and claims the benefit of, U.S. Provisional Application No. 60/160,859, entitled "System And Method For Speech Verification Using A Confidence Measure," filed Oct. 21, 1999, as well as U.S. Non-Provisional Application No. 09/553,985, U.S, Pat. No. 6,473,735, entitled "System And Method For Speech Verification Using A Confidence Measure," filed Apr. 20, 2000, both of which are hereby incorporated by reference.

BACKGROUND SECTION

1. Field of the Invention

This invention relates generally to electronic speech recognition systems, and relates more particularly to a system and method for speech verification using an efficient confidence measure.

2. Description of the Background Art

Implementing an effective and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

Speech-activated electronic systems may be used in a variety of noisy environments such as industrial facilities, manufacturing facilities, commercial vehicles, passenger vehicles, homes, and office environments. A significant amount of noise in an environment may interfere with and degrade the performance and effectiveness of speech-activated systems. System designers and manufacturers typically seek to develop speech-activated systems that provide reliable performance in noisy environments. In a noisy environment, sound energy detected by a speech-activated system may contain speech and a significant amount of noise. In such an environment, the speech may be masked by the noise and be undetected. This result is unacceptable for reliable performance of the speech-activated system.

Alternatively, sound energy detected by the speech-activated system may contain only noise. The noise may be of such a character that the speech-activated system identifies the noise as speech. This result reduces the effectiveness of the speech-activated system, and is also unacceptable for reliable performance. Verifying that a detected signal is actually speech increases the effectiveness and reliability of speech-activated systems.

A speech-activated system may have a limited vocabulary of words that the system is programmed to recognize. The system should respond to words or phrases that are in its vocabulary, and should not respond to words or phrases that are not in its vocabulary. Verifying that a recognized word is in the system's vocabulary increases the accuracy and reliability of speech-activated systems.

Therefore, for all the foregoing reasons, implementing an effective and efficient method for a system user to interface with electronic devices remains a significant consideration of system designers and manufacturers.

SUMMARY

In accordance with the present invention, a system and method are disclosed for performing speech verification using an efficient confidence measure. In one embodiment, initially, a search module from a speech recognizer may preferably access feature vectors for a given utterance, and may then compare the feature vectors to word models corresponding to a system vocabulary. The search module may then responsively generate a series of potential recognition candidates with their corresponding recognition scores based on the foregoing comparison with the word models. The search module may also rank the recognition candidates into a sorted N-best list according to their respective recognition scores.

A pseudo filler score calculator from a speech verifier may then access the sorted N-best list to calculate a pseudo filler score in accordance with the present invention. The pseudo filler score calculator may determine a pseudo filler score in any effective manner. For example, the pseudo filler score calculator may preferably generate a pseudo filler score by averaging selected recognition scores from the N-best list, excluding only the highest or best recognition score. In certain embodiments, the pseudo filler score calculator may preferably calculate a pseudo filler score by determining an arithmetic average or a geometric mean of the top "k" recognition scores from the N-best list.

A confidence measure calculator from the speech verifier may then calculate a confidence measure by utilizing any effective means or technique. For example, the confidence measure calculator may preferably access the pseudo filler score, and may also access the highest or best recognition score from the N-best list in order to perform a confidence measure calculation. In certain embodiments, the confidence measure calculator may preferably calculate a confidence measure by calculating the difference between the foregoing best recognition score and the pseudo filler score.

A comparator from the speech verifier may then compare the confidence measure to a threshold value obtained from local threshold registers or from any other appropriate source. In accordance with the present invention, the threshold value may include any selectable value. For example, a single simplified threshold value may be selected for use by the comparator. Alternately, multiple thresholds may be utilized depending upon the degree of accuracy required during the speech recognition process. In certain embodiments, a different threshold may be selected to correspond to each best recognition candidate that is evaluated by the speech verifier.

If the comparator determines that the confidence measure is greater than the threshold value, then the speech verifier may preferably verify the best recognition candidate as a valid utterance. Conversely, if the comparator determines that the confidence measure is not greater than the threshold value, then the speech verifier may preferably reject the best recognition candidate as an invalid utterance.

The present invention advantageously utilizes only information that is normally provided by the search module (for example, the N-best list and corresponding recognition scores) to perform the speech verification process. The present invention thus provides a non-intrusive and robust system and method for performing an efficient speech verification procedure.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for speech verification using an efficient confidence measure, and may include a speech verifier which may preferably compare a confidence measure for a recognized word to a predetermined threshold value in order to determine whether the recognized word is valid, where the recognized word corresponds to a word model that produces a highest recognition score. In accordance with the present invention, the foregoing confidence measure may preferably be calculated by advantageously utilizing the recognition score for the recognized word and a pseudo filler score which may preferably be based upon selected average recognition scores from an N-best list of recognition candidates.

Figure 1:
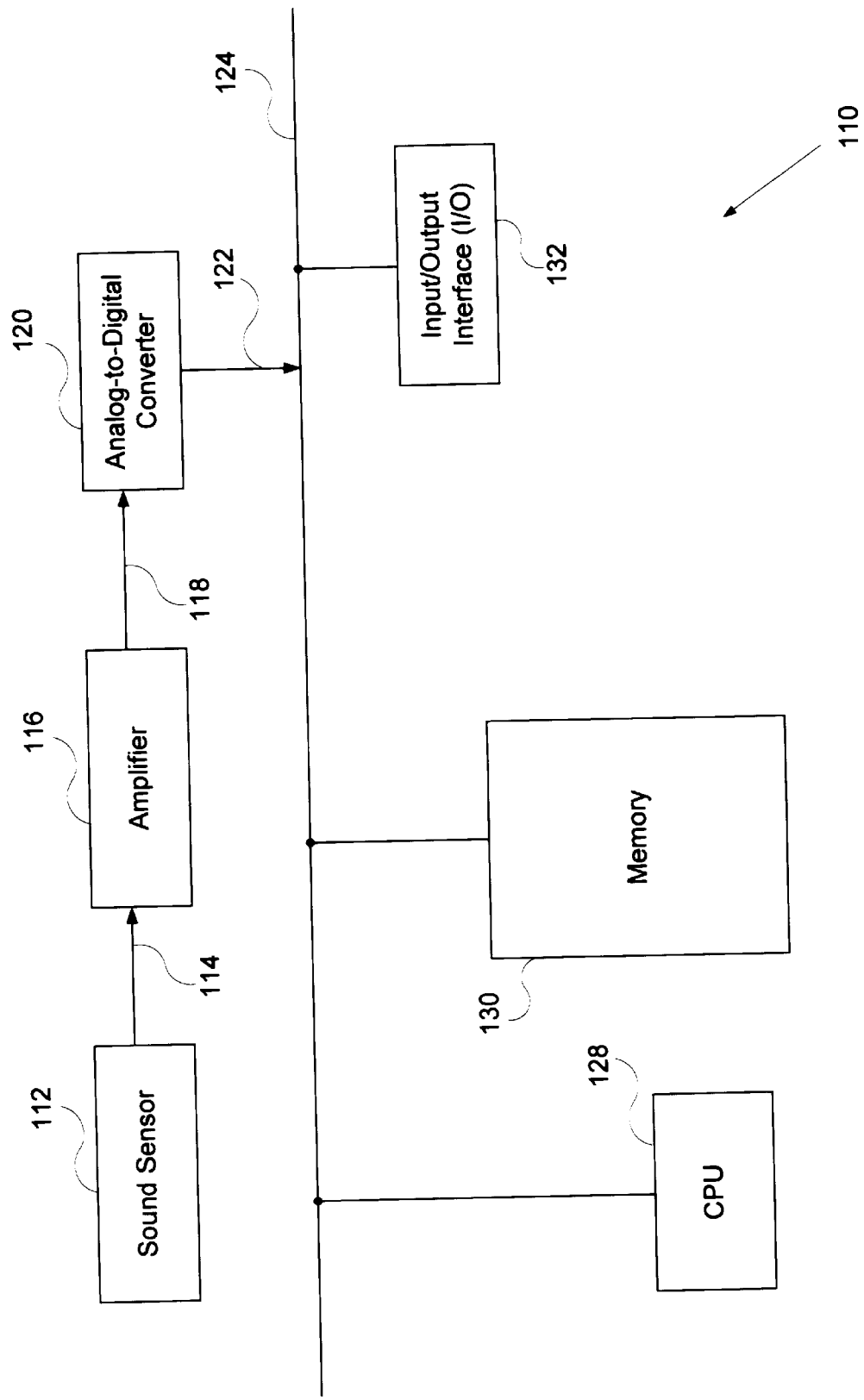
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2–7. After the speech data is processed, CPU 128 may then provide the results of the speech detection analysis to other devices (not shown) via input/output interface 132.

Figure 2:
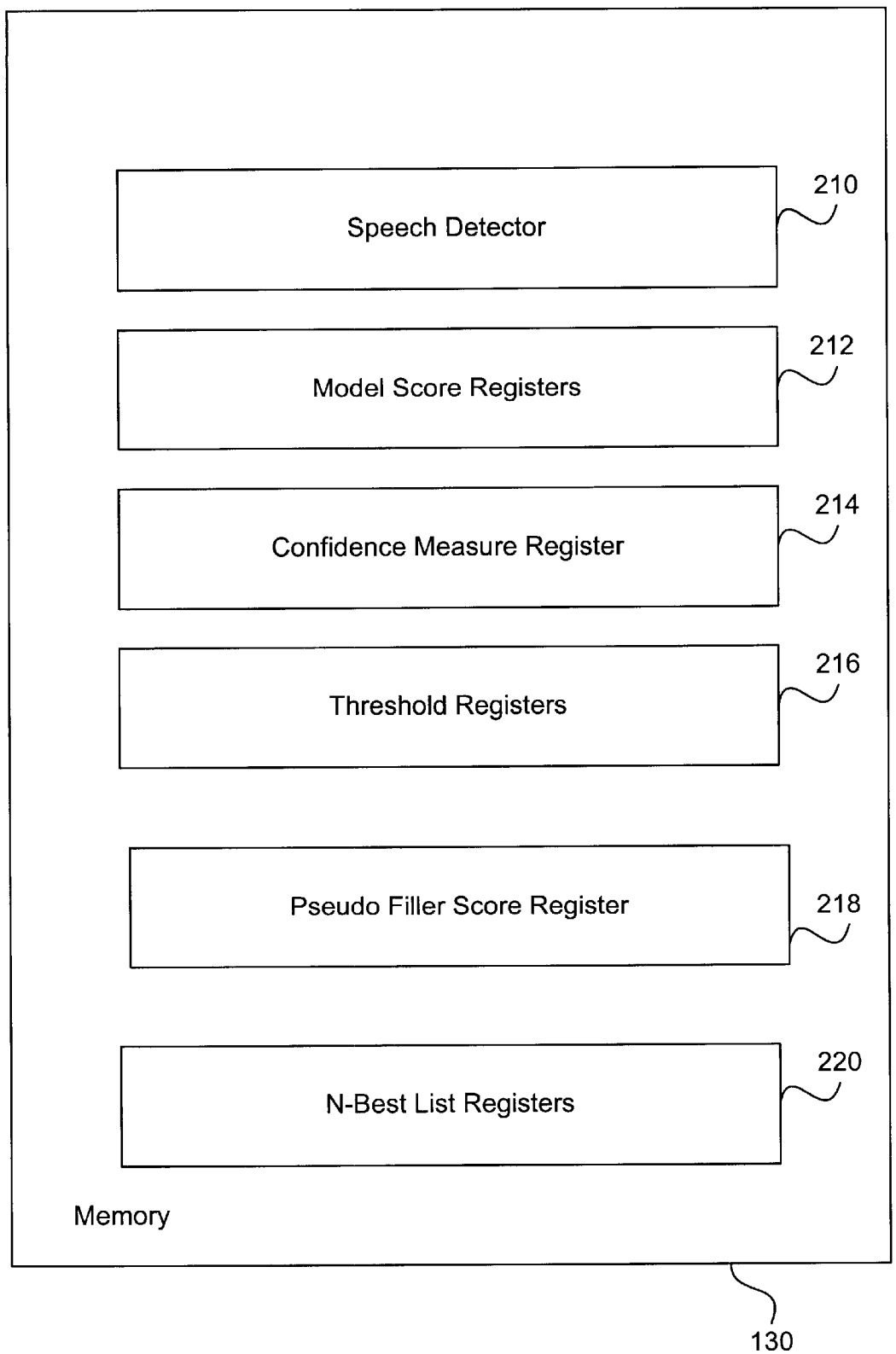
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech detector 210, model score registers 212, confidence measure register 214, threshold registers 216, pseudo filler score register 218, and N-best list registers 220.

In the FIG. 2 embodiment, speech detector 210 includes a series of software modules that are executed by CPU 128 to analyze and detect speech data, and which are further described below in conjunction with FIGS. 3–4. In alternate embodiments, speech detector 210 may readily be implemented using various other software and/or hardware configurations.

Model score registers 212, confidence measure register 214, threshold registers 216, pseudo filler score register 218, and N-best list registers 220 contain respective variable values that are calculated and utilized by speech detector 210 to implement the speech verification method of the present invention. The utilization and functionality of model score registers 212, confidence measure register 214, threshold registers 216, pseudo filler score register 218, and N-best list registers 220 are further discussed below in conjunction with FIGS. 3–7.

Figure 3:
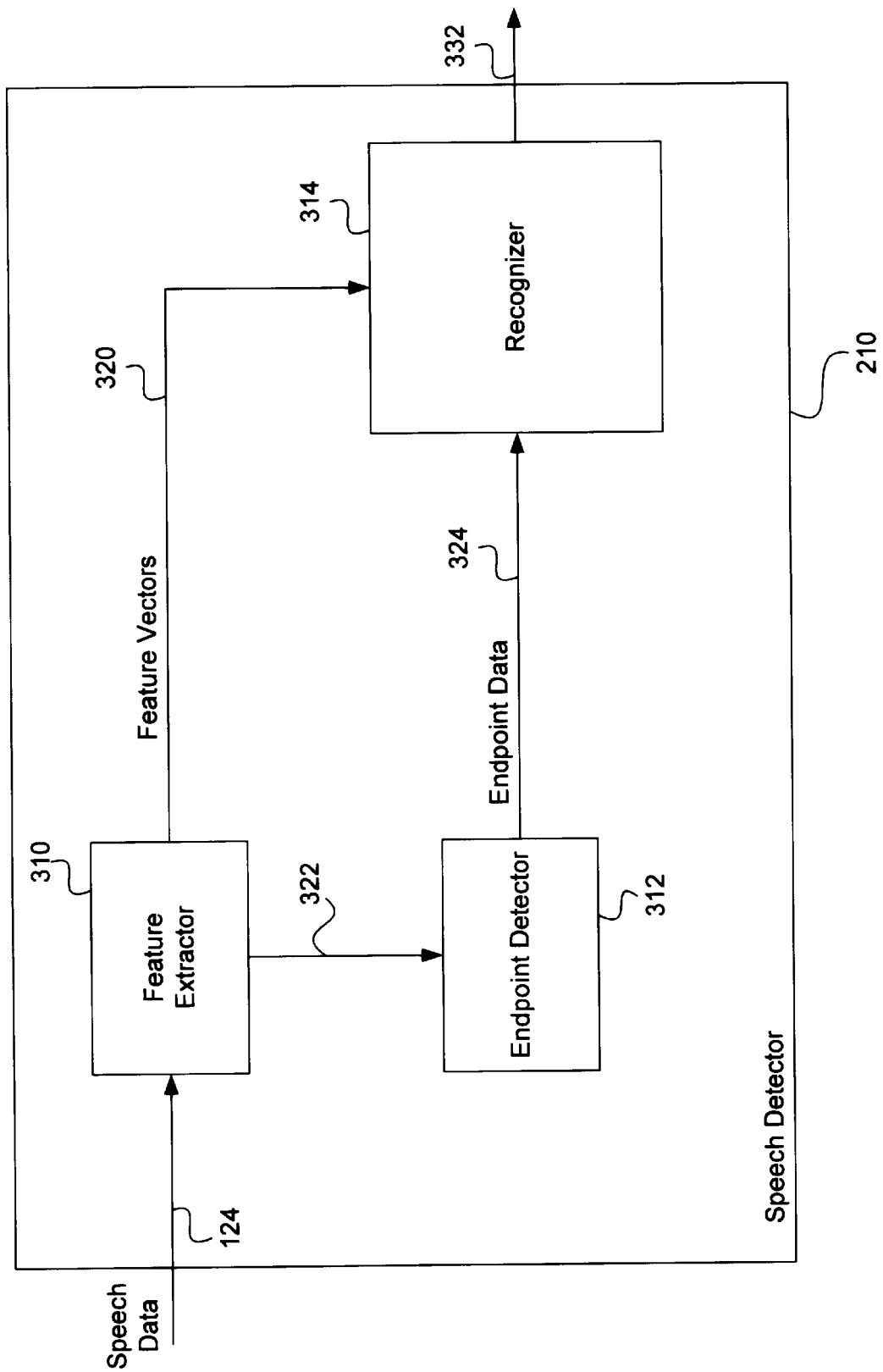
FIG. 3 is a block diagram for one embodiment of the speech detector of FIG. 2, in accordance with the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314.

Analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize isolated words or commands in a predetermined vocabulary of system 110. In the FIG. 3 embodiment, recognizer 314 is configured to recognize a vocabulary of approximately one hundred twenty five words or commands. However, a vocabulary including any number of words or commands is within the scope of the present invention. The foregoing vocabulary may correspond to any desired commands, instructions, or other communications for system 110. Thus, verifying a recognized word or phrase as valid is significant for proper operation of system 110. Valid recognized vocabulary words or commands are output to system 110 via path 332.

Figure 4:
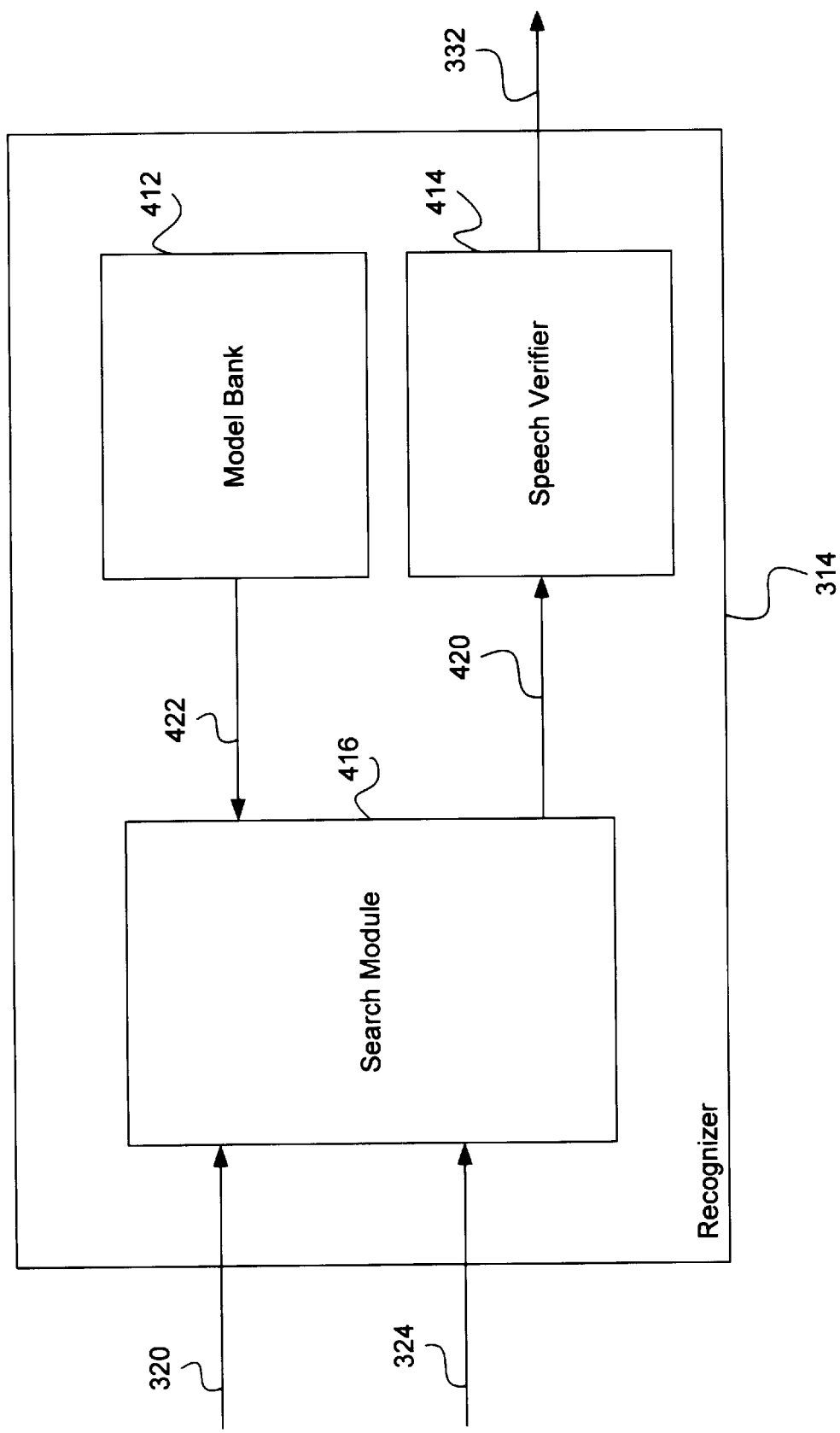
FIG. 4 is a block diagram for one embodiment of the recognizer of FIG. 3, in accordance with the present invention.

Referring now to FIG. 4, a block diagram for one embodiment of the recognizer 314 of FIG. 3 is shown, according to the present invention. Recognizer 314 includes, but is not limited to, a search module 416, a model bank 412, and a speech verifier 414. Model bank 412 includes a word model for every word or command in the vocabulary of system 110. Each model may preferably be a Hidden Markov Model that has been trained to recognize a specific word or command in the vocabulary.

Search module 416 preferably receives feature vectors from feature extractor 310 via path 320, and receives endpoint data from endpoint detector 312 via path 324. Search module 416 compares the feature vectors for an utterance (the signal between endpoints) with each word model in model bank 412. Search module 416 produces a recognition score for the utterance from each model, and stores the recognition scores in model score registers 212. Search module 416 preferably ranks the recognition scores for the utterance from highest to lowest, and stores a specified number of the ranked recognition scores as an N-best list in N-best list registers 220. The word model that corresponds to the highest recognition score is the first recognition candidate, the word model that corresponds to the next-highest recognition score is the second recognition candidate, the word model that corresponds to the third-highest recognition score is the third recognition candidate, and in this way, word models in model bank 412 may be ranked. Typically, the first recognition candidate is considered to be the recognized word.

Search module 416 outputs the ranked N-best list to speech verifier 414 via path 420. In one embodiment, speech verifier 414 calculates a confidence measure for the utterance by calculating the difference between the recognition score of the first candidate and a pseudo filler score, and then stores the confidence measure in confidence measure register 214. Speech verifier 414 next compares the confidence measure for the utterance to a threshold value stored in threshold registers 216. The value of the confidence measure is a measure of the confidence that the recognized word is a valid vocabulary word of system 110.

If the confidence measure for the utterance is greater than or equal to the threshold value, then the word identified as the first candidate, or recognized word, is considered valid, and recognizer 314 outputs the result on path 332. If the confidence measure is less than the threshold value, then the first candidate is considered an invalid vocabulary word, and recognizer 314 outputs no result.

The threshold values stored in threshold registers 216 typically depend on the vocabulary words of system 110. Different sets of threshold values may be used in speech verifier 414, each set of threshold values providing different advantages to system 110.

Figure 5:
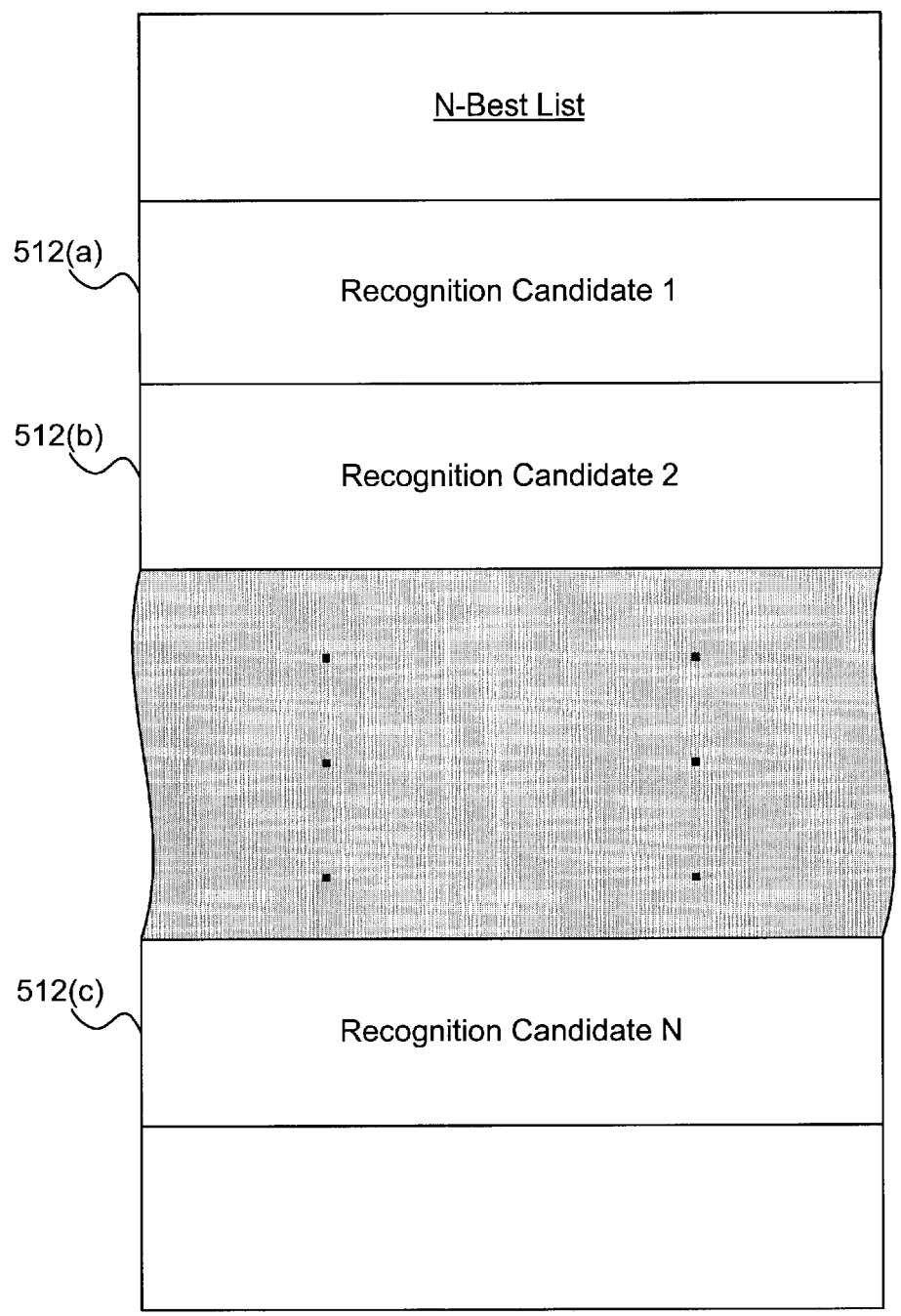
FIG. 5 is a block diagram of one embodiment of an N-best list, in accordance with the present invention.

Referring now to FIG. 5, a block diagram of an N-best list 510 is shown, in accordance with one embodiment of the present invention. In the FIG. 5 embodiment, N-best list 510 may preferably include a recognition candidate 1 (512(a)) through a recognition candidate N (512(c)). In alternate embodiments, N-best list 510 may readily include various other elements or functionalities in addition to, or instead of, those elements or functionalities discussed in conjunction with the FIG. 5 embodiment.

In the FIG. 5 embodiment, N-best list 510 may readily be implemented to include any desired number of recognition candidates 512 that may include any required type of information. In the FIG. 5 embodiment, each recognition candidate 512 may preferably include a search result (a word, phrase, or command) in text format, and a corresponding recognition score. In the FIG. 5 embodiment, the recognition candidates 512 of N-best list 510 are preferably sorted and ranked by their recognition score, with recognition candidate 1 (512(a)) having the highest or best recognition score, and recognition candidate N (512(c)) have the lowest or worst recognition score. The utilization of N-best list 510 is further discussed below in conjunction with FIGS. 6 and 7.

Figure 6:
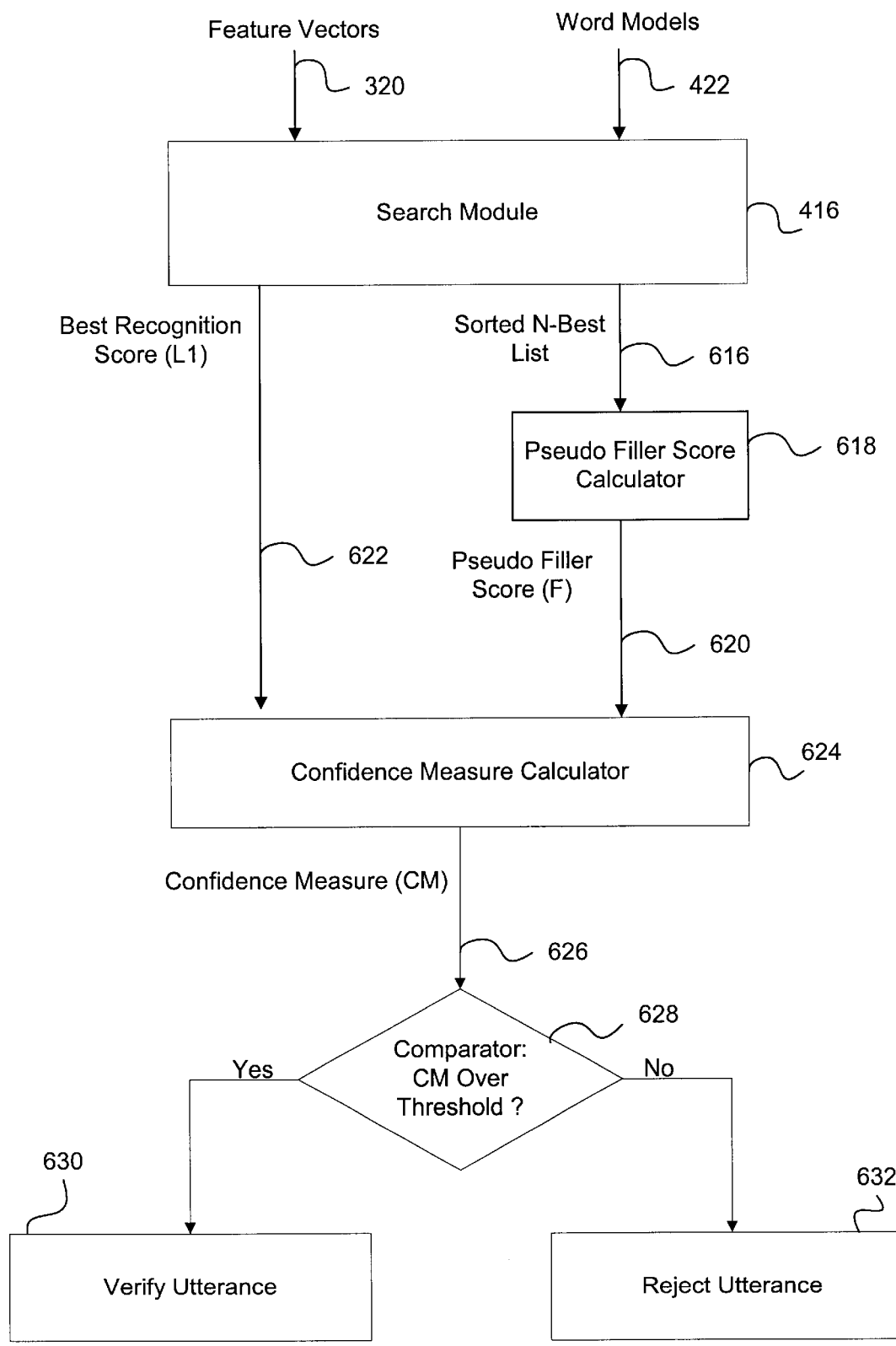
FIG. 6 is a block diagram illustrating a speech verification procedure, in accordance with one embodiment of the present invention.

Referring now to FIG. 6, a block diagram illustrating a speech verification procedure is shown, in accordance with one embodiment of the present invention. In alternate embodiments, the present invention may readily perform speech verification using various other elements or functionalities in addition to, or instead of, those elements or functionalities discussed in conjunction with the FIG. 6 embodiment.

In the FIG. 6 embodiment, initially, search module 416 may preferably access feature vectors for a given utterance via path 320, and then may compare the feature vectors to word models that may be accessed via path 422. Search module 416 may then responsively generate a series of potential recognition candidates 512 with their corresponding recognition scores based on the foregoing comparison to word models. Search module 416 may also rank the recognition candidates 512 into a sorted N-best list according to their respective recognition scores.

In the FIG. 6 embodiment, a pseudo filler score calculator 618 may access the sorted N-best list via path 616 to calculate a pseudo filler score in accordance with the present invention. Pseudo filler score calculator 618 may determine a pseudo filler score in any effective manner. However, in the FIG. 6 embodiment, pseudo filler score calculator 618 may preferably generate a pseudo filler score by averaging the recognition scores from the N-best list 510, excluding only the highest or best recognition score.

In certain embodiments, pseudo filler score calculator 618 may preferably calculate a pseudo filler score by determining an arithmetic average of the top "k" recognition scores from N-best list 510 (omitting the best recognition score) in accordance with the following formula:

$$F = \frac{1}{k-1}\sum_{n=2}^{k} L_n$$

where F is the pseudo filler score, $L_n$ is the recognition score of the "n" word of N-best list 510, and "k" is a selectable integer value that is less than or equal to "N" of the N-best list 510.

In certain other embodiments, pseudo filler score calculator 618 may preferably calculate a pseudo filler score by determining a geometric mean of the top "k" recognition scores from N-best list 510 (omitting the best recognition score) in accordance with the following formula:

$$F = \sqrt[k-1]{\prod_{n=2}^{k} L_n}$$

where F is the pseudo filler score, $L_n$ is the recognition score of the "n" word of N-best list 510, and "k" is a selectable integer value that is less than or equal to "N" of the N-best list 510.

In the FIG. 6 embodiment, a confidence measure calculator 624 may then calculate a confidence measure (CM) by utilizing any effective means or technique. In the FIG. 6 embodiment, confidence measure calculator 624 may preferably access the pseudo filler score via path 620, and may also access the highest or best recognition score ($L_1$) from search module 416 via path 622 to perform a confidence measure calculation.

In certain embodiments, confidence measure calculator 624 may preferably calculate a basic confidence measure by determining a difference between the foregoing best recognition score and the pseudo filler score in accordance with the following formula:

$$CM = L_1 - F$$

where CM is the confidence measure, $L_1$ is the best recognition score of the first recognition candidate 512(*a*) of N-best list 510, and F is the pseudo filler score.

In certain other embodiments, confidence measure calculator 624 may preferably calculate an enhanced confidence measure in accordance with the following formula:

$$CM = \frac{L_1 - L_2}{L_1 - F}$$

where CM is the confidence measure, $L_1$ is the best recognition score of the first recognition candidate 512(*a*) of N-best list 510, $L_2$ is the second-best recognition score of the second recognition candidate 512(*b*) of N-best list 510, and F is the pseudo filler score.

In the FIG. 6 embodiment, a comparator 628 may then access the confidence measure (CM) via path 626, and compare the confidence measure to a threshold value obtained from threshold registers 216 (FIG. 2) or from any other appropriate source. In accordance with the present invention, the threshold value may include any selectable value. For example, a single simplified threshold value may be selected for use by comparator 628. Alternately, multiple thresholds may be utilized depending upon the degree of accuracy required during the speech recognition process. In certain embodiments, a different individual threshold may be selected to correspond to each best recognition candidate that is evaluated by speech verifier 414.

In the FIG. 6 embodiment, if comparator 628 determines that the confidence measure is greater than the threshold value, then speech verifier 414 may preferably verify the first recognition candidate 512(*a*) as a valid utterance, as shown in block 630. Conversely, if comparator 628 determines that the confidence measure is not greater than the threshold value, then speech verifier 414 may preferably reject the first recognition candidate 512(*a*) as an invalid utterance, as shown in block 632.

The present invention advantageously utilizes only information normally provided by search module 416 (N-best list 510 and corresponding recognition scores) to perform the speech verification process. The present invention thus provides a non-intrusive and robust system and method for performing an efficient speech verification procedure.

Figure 7:
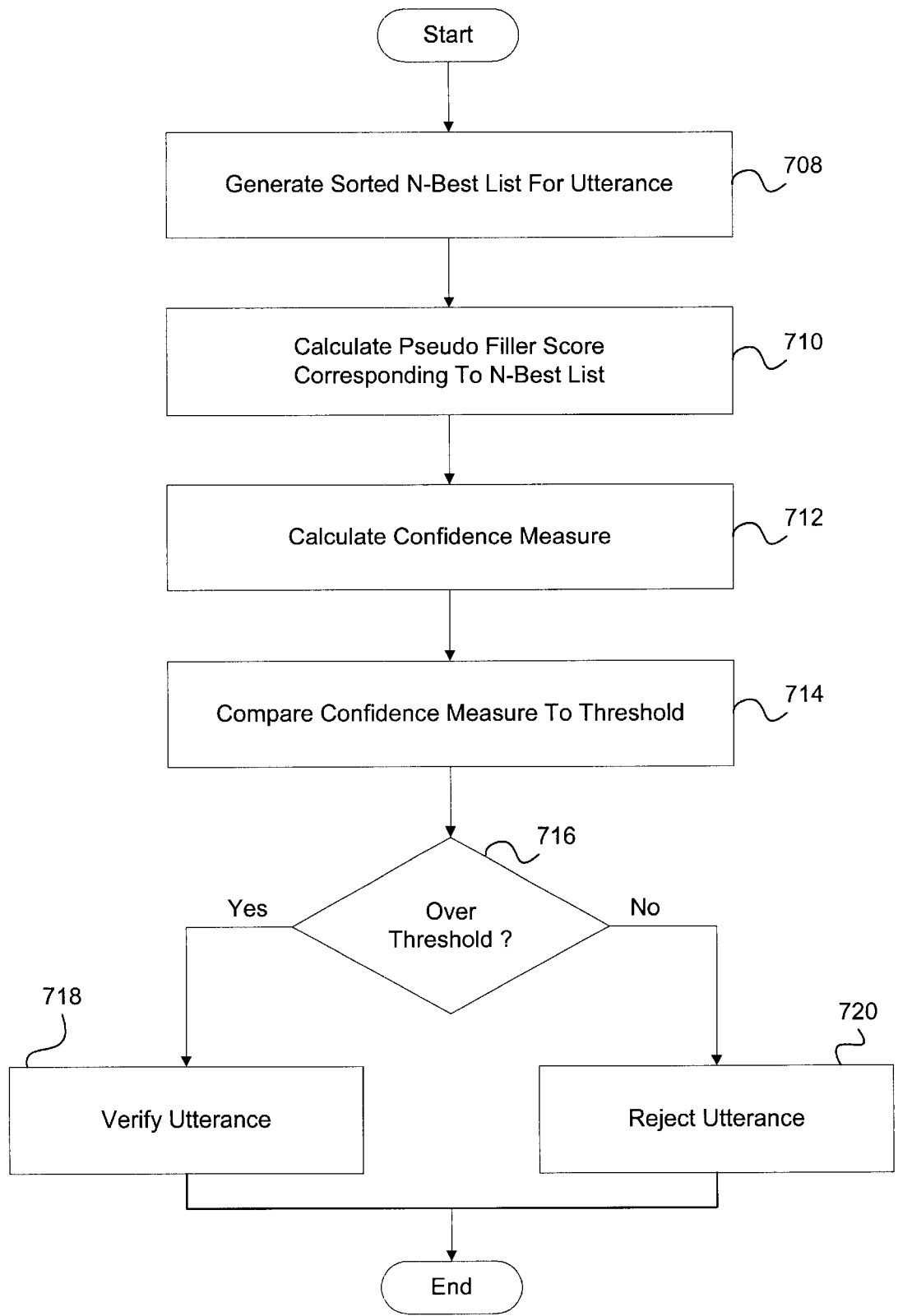
FIG. 7 is a flowchart of method steps for performing a speech verification procedure, according to one embodiment of the present invention.

Referring now to FIG. 7, a flowchart of method steps for performing a speech verification procedure is shown, in accordance with one embodiment of the present invention. The FIG. 7 embodiment is presented for purposes of illustration, and in alternate embodiments, the present invention may readily utilize various steps and sequences other than those discussed in conjunction with the FIG. 7 embodiment.

In the FIG. 7 embodiment, in step 708, search module 416 may preferably generate a sorted N-best list 510 corresponding to a particular utterance. Then, in step 710, a pseudo filler score calculator of a speech verifier 414 may preferably access the sorted N-best list 510, and responsively calculate a pseudo filler score, as discussed above in conjunction with FIG. 6.

In step 712, a confidence measure calculator 624 of speech verifier 414 may preferably determine a confidence measure corresponding to a potential recognized word. Confidence measure calculator 624 may preferably utilize the foregoing pseudo filler score and a best recognition score corresponding to the best recognition candidate 512(*a*) of the N-best list 510 to determine the confidence measure, as discussed above in conjunction with FIG. 6.

In step 714, a comparator from speech verifier 414 may preferably compare the confidence measure to a selected threshold value, as discussed above in conjunction with FIG. 6. In step 716, comparator 414 may preferably determine whether the confidence measure is greater than the threshold value. If comparator 628 determines that the confidence measure is greater than the threshold value, then speech verifier 414 may preferably verify the first recognition candidate 512(*a*) as a valid utterance, as shown in step 718. Conversely, if comparator 628 determines that the confidence measure is not greater than the threshold value, then speech verifier 414 may preferably reject the first recognition candidate 512(*a*) as an invalid utterance, as shown in step 720.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for performing a speech verification of an utterance, comprising:
   a search module configured to generate an N-best list of recognition candidates corresponding to said utterance;
   a pseudo filler score calculator coupled to said search module for determining a pseudo filler score that is based upon recognition scores corresponding to said recognition candidates;
   a confidence measure calculator for utilizing said pseudo filler score and a best recognition score of a best recognition candidate to determine a confidence measure; and
   a comparator configured to compare said confidence measure to a threshold value for determining whether to verify said best recognition candidate.

2. The system of claim 1 wherein said system comprises a speech recognizer that includes said search module, a model bank of word models corresponding to a vocabulary of said system, and a speech verifier that includes said pseudo filler score calculator, said confidence measure calculator, and said comparator.

3. The system of claim 1 wherein said search module compares feature vectors corresponding to said utterance with word models to thereby generate said recognition candidates and said recognition scores that each correspond to a different one of said recognition candidates.

4. The system of claim 1 wherein said search module ranks said N-best list according to said recognition scores that each correspond to a different one of said recognition candidates, said N-best list including said best recognition candidate having said best recognition score and a predetermined additional number of said recognition candidates.

5. The system of claim 1 wherein said pseudo filler score calculator determines said pseudo filler score by omitting said best recognition score, and then analyzing remaining ones of said recognition scores from said N-best list.

6. The system of claim 1 wherein said pseudo filler score calculator determines said pseudo filler score by analyzing only selected ones of said recognition scores from said N-best list.

7. The system of claim 1 wherein said pseudo filler score calculator determines said pseudo filler score by calculating an arithmetic average of said recognition scores from said N-best list.

8. The system of claim 1 wherein said pseudo filler score calculator determines said pseudo filler score according to a following formula:

$$F = \frac{1}{k-1} \sum_{n=2}^{k} L_n$$

where F is said pseudo filler score, $L_n$ is a recognition score of an "n" word of said N-best list, and "k" is a selectable integer value that is less than or equal to "N" of said N-best list.

9. The system of claim 1 wherein said pseudo filler score calculator determines said pseudo filler score by calculating a geometric mean of said recognition scores from said N-best list.

10. The system of claim 1 wherein said pseudo filler score calculator determines said pseudo filler score according to a following formula:

$$F = \sqrt[k-1]{\prod_{n=2}^{k} L_n}$$

where F is the pseudo filler score, $L_n$ is the recognition score of the "n" word of said N-best list, and "k" is a selectable integer value that is less than or equal to "N" of said N-best list.

11. The system of claim 1 wherein said confidence measure calculator determines said confidence measure corresponding to said best recognition candidate by comparing said pseudo filler score and at least one of said recognition scores from said N-best list.

12. The system of claim 1 wherein said confidence measure calculator determines said confidence measure by calculating a difference value between said pseudo filler score and said best recognition score from said N-best list.

13. The system of claim 1 wherein said confidence measure calculator determines said confidence measure according to a following formula:

$$CM = L_1 - F$$

where CM is said confidence measure, $L_1$ is said best recognition score of said best recognition candidate of said N-best list, and F is said pseudo filler score.

14. The system of claim 1 wherein said confidence measure calculator determines said confidence measure according to a following formula:

$$CM = \frac{L_1 - L_2}{L_1 - F}$$

where CM is said confidence measure, $L_1$ is said best recognition score of said best recognition candidate of said N-best list, $L_2$ is a second-best recognition score of a second-best recognition candidate of said N-best list, and F is said pseudo filler score.

15. The system of claim 1 wherein said comparator selectively accesses said threshold value from threshold registers, and then compares said confidence measure to said threshold value to generate a verification result corresponding to said best recognition candidate.

16. The system of claim 1 wherein said comparator utilizes a single threshold value that is selected for efficiently and economically performing said speech verification.

17. The system of claim 1 wherein said threshold value may be selected from several threshold options to optimally achieve pre-determined performance objectives while performing said speech verification.

18. The system of claim 1 wherein said comparator selectively utilizes different threshold values that each correspond to a different best recognition candidate.

19. The system of claim 2 wherein said speech verifier designates said best recognition candidate as valid whenever said confidence measure exceeds said threshold value, said speech verifier rejecting said best recognition candidate as invalid whenever said confidence measure fails to exceed said threshold value.

20. The system of claim 2 wherein said speech verifier non-intrusively utilizes only information routinely provided by said search module in order to perform said speech verification, said information including said N-best list and said recognition scores.

21. A method for performing a speech verification of an utterance, comprising the steps of:

generating an N-best list of recognition candidates corresponding to said utterance by using a search module;

utilizing a pseudo filler score calculator to determine a pseudo filler score that is based upon recognition scores corresponding to said recognition candidates;

determining a confidence measure with a confidence measure calculator by using said pseudo filler score and a best recognition score of a best recognition candidate; and comparing said confidence measure to a threshold value with a comparator to thereby determine whether to verify said best recognition candidate.

22. The method of claim 21 wherein said system comprises a speech recognizer that includes said search module, a model bank of word models corresponding to a vocabulary of said system, and a speech verifier that includes said pseudo filler score calculator, said confidence measure calculator, and said comparator.

23. The method of claim 21 wherein said search module compares feature vectors corresponding to said utterance with word models to thereby generate said recognition candidates and said recognition scores that each correspond to a different one of said recognition candidates.

24. The method of claim 21 wherein said search module ranks said N-best list according to said recognition scores that each correspond to a different one of said recognition candidates, said N-best list including said best recognition candidate having said best recognition score and a pre-determined additional number of said recognition candidates.

25. The method of claim 21 wherein said pseudo filler score calculator determines said pseudo filler score by omitting said best recognition score, and then analyzing remaining ones of said recognition scores from said N-best list.

26. The method of claim 21 wherein said pseudo filler score calculator determines said pseudo filler score by analyzing only selected ones of said recognition scores from said N-best list.

27. The method of claim 21 wherein said pseudo filler score calculator determines said pseudo filler score by calculating an arithmetic average of said recognition scores from said N-best list.

28. The method of claim 21 wherein said pseudo filler score calculator determines said pseudo filler score according to a following formula:

$$F = \frac{1}{k-1} \sum_{n=2}^{k} L_n$$

where F is said pseudo filler score, $L_n$ is a recognition score of an "n" word of said N-best list, and "k" is a selectable integer value that is less than or equal to "N" of said N-best list.

29. The method of claim 21 wherein said pseudo filler score calculator determines said pseudo filler score by calculating a geometric mean of said recognition scores from said N-best list.

30. The method of claim 21 wherein said pseudo filler score calculator determines said pseudo filler score according to a following formula:

$$F = \sqrt[k-1]{\prod_{n=2}^{k} L_n}$$

where F is the pseudo filler score, $L_n$ is the recognition score of the "n" word of said N-best list, and "k" is a selectable integer value that is less than or equal to "N" of said N-best list.

31. The method of claim 21 wherein said confidence measure calculator determines said confidence measure corresponding to said best recognition candidate by comparing said pseudo filler score and at least one of said recognition scores from said N-best list.

32. The method of claim 21 wherein said confidence measure calculator determines said confidence measure by calculating a difference value between said pseudo filler score and said best recognition score from said N-best list.

33. The method of claim 21 wherein said confidence measure calculator determines said confidence measure according to a following formula:

$$CM = L_1 - F$$

where CM is said confidence measure, $L_1$ is said best recognition score of said best recognition candidate of said N-best list, and F is said pseudo filler score.

34. The method of claim 21 wherein said confidence measure calculator determines said confidence measure according to a following formula:

$$CM = \frac{L_1 - L_2}{L_1 - F}$$

where CM is said confidence measure, $L_1$ is said best recognition score of said best recognition candidate of said N-best list, $L_2$ is a second-best recognition score of a second-best recognition candidate of said N-best list, and F is said pseudo filler score.

35. The method of claim 21 wherein said comparator selectively accesses said threshold value from threshold registers, and then compares said confidence measure to said threshold value to generate a verification result corresponding to said best recognition candidate.

36. The method of claim 21 wherein said comparator utilizes a single threshold value that is selected for efficiently and economically performing said speech verification.

37. The method of claim 21 wherein said threshold value may be selected from several threshold options to optimally achieve pre-determined performance objectives while performing said speech verification.

38. The method of claim 21 wherein said comparator selectively utilizes different threshold values that each correspond to a different best recognition candidate.

39. The method of claim 22 wherein said speech verifier designates said best recognition candidate as valid whenever said confidence measure exceeds said threshold value, said speech verifier rejecting said best recognition candidate as invalid whenever said confidence measure fails to exceed said threshold value.

40. The method of claim 22 wherein said speech verifier non-intrusively utilizes only information routinely provided by said search module in order to perform said speech verification, said information including said N-best list and said recognition scores.

41. A computer-readable medium comprising program instructions for performing a speech verification of an utterance, by performing the steps of:

generating an N-best list of recognition candidates corresponding to said utterance by using a search module;

utilizing a pseudo filler score calculator to determine a pseudo filler score that is based upon recognition scores corresponding to said recognition candidates;

determining a confidence measure with a confidence measure calculator by using said pseudo filler score and a best recognition score of a best recognition candidate; and comparing said confidence measure to a threshold value with a comparator to thereby determine whether to verify said best recognition candidate.

42. A system for performing a speech verification of an utterance, comprising:

means for generating an N-best list of recognition candidates corresponding to said utterance;

means for calculating a pseudo filler score that is based upon recognition scores corresponding to said recognition candidates;

means for determining a confidence measure by using said pseudo filler score and a best recognition score of a best recognition candidate; and means for comparing said confidence measure to a threshold value to thereby determine whether to verify said best recognition candidate.

43. A method for performing a speech verification of an utterance, comprising the steps of:

generating a list of recognition candidates corresponding to said utterance;

determining a confidence measure from a pseudo filler score and a best recognition score of a best recognition candidate from said list; and comparing said confidence measure to a threshold value to thereby determine whether to verify said best recognition candidate.

* * * * *